(12) United States Patent
Eslambolchi et al.

(10) Patent No.: US 9,992,215 B2
(45) Date of Patent: Jun. 5, 2018

(54) NETWORK INTRUSION DETECTION (71) Applicant: Webroot Inc., Broomfield, CO (US)

(72) Inventors: Hossein Eslambolchi, Rancho Santa Fe, CA (US); Louie Gasparini, San Mateo, CA (US); Chandra Madhekar, Del Mar, CA (US); William Wright, Los Gatos, CA (US)

(73) Assignee: Webroot Inc., Broomfield, CO (US)

( * ) Notice: Subject to any disclaimer, the term of this patent is extended or adjusted under 35 U.S.C. 154(b) by 26 days.

(21) Appl. No.: 15/027,234

(22) PCT Filed: Oct. 2, 2014

(86) PCT No.: PCT/US2014/058915
§ 371 (c)(1),
(2) Date: Apr. 4, 2016

(87) PCT Pub. No.: WO2015/051185
PCT Pub. Date: Apr. 9, 2015

(65) Prior Publication Data
US 2016/0255104 A1 Sep. 1, 2016

Related U.S. Application Data

(60) Provisional application No. 61/887,245, filed on Oct. 4, 2013.

(51) Int. Cl.
*H04L 29/06* (2006.01)
*G06F 21/55* (2013.01)

(52) U.S. Cl.
CPC ........ *H04L 63/1425* (2013.01); *G06F 21/552* (2013.01); *G06F 21/554* (2013.01);
(Continued)

(58) Field of Classification Search
CPC .................................................. H04L 63/1425
See application file for complete search history.

(56) References Cited

U.S. PATENT DOCUMENTS

2002/0087882 A1* 7/2002 Schneier ............... G06F 21/552
726/23
2004/0107219 A1* 6/2004 Rosenberger ........... H04L 43/00
(Continued)

OTHER PUBLICATIONS

Krügel et al.; Service specific anomaly detection for network intrusion detection; Published in: Proceeding SAC '02 Proceedings of the 2002 ACM symposium on Applied computing; pp. 201-208; Madrid, Spain; Mar. 11-14, 2002; ACM Digital Library.*
(Continued)

*Primary Examiner* — Bradley Holder
(74) *Attorney, Agent, or Firm* — Merchant & Gould P.C.

(57) ABSTRACT

A system for identifying a network intrusion includes four modules. The first module monitors network transmissions and creates a model of regular network activity. The second module receives the model of regular network activity and sets a threshold for irregular usage based on the model. The third module receives the threshold, compares a value of a candidate inter-nodal transmission of the network to the threshold, and identifies a potential intrusion when the value exceeds the threshold. The fourth module analyzes a transmission behavior of one or more nodes of the candidate inter-nodal transmission and identifies the network intrusion.

26 Claims, 4 Drawing Sheets

(52) U.S. Cl.
CPC ...... *H04L 63/1408* (2013.01); *H04L 63/1416* (2013.01); *H04L 63/1433* (2013.01); *H04L 69/22* (2013.01)

(56) References Cited

U.S. PATENT DOCUMENTS

| | | |
|---|---|---|
| 2004/0193943 A1 | 9/2004 | Angelino et al. |
| 2007/0300301 A1 | 12/2007 | Cangini |
| 2008/0201778 A1* | 8/2008 | Guo ...................... G06F 21/552 726/23 |
| 2009/0288165 A1* | 11/2009 | Qiu ...................... G06F 21/552 726/23 |
| 2010/0325720 A1* | 12/2010 | Etchegoyen .......... H04L 63/101 726/17 |
| 2012/0210429 A1 | 8/2012 | Stute |
| 2012/0294158 A1* | 11/2012 | Boot .................... H04L 43/062 370/252 |
| 2012/0297483 A1* | 11/2012 | Boot .................. H04L 63/1425 726/23 |

OTHER PUBLICATIONS

Manikopoulos et al.; Network intrusion and fault detection: a statistical anomaly approach; Published in: IEEE Communications Magazine ( vol. 40, Issue: 10, Oct. 2002 ); pp. 76-82; Date of Publication: Dec. 10, 2002; IEEE Xplore.*

Extended European Search Report for EP Application No. 14850450.9, dated Feb. 3, 2017, 6 pages.

* cited by examiner

NETWORK INTRUSION DETECTION

CROSS-REFERENCE TO RELATED APPLICATIONS

This application is a U.S. National Stage of International Application No. PCT/US2014/058915 filed Oct. 2, 2014, which claims priority to U.S. Provisional Application No. 61/887,245 filed Oct. 4, 2013. The contents of these applications are incorporated herein by reference in their entirety.

FIELD OF THE INVENTION

The present invention relates to devices, systems, methods, and computer-readable mediums for providing security to networks, and more particularly, to identifying intrusions in electronic networks.

BACKGROUND OF THE INVENTION

Cybercrime is costly and has major consequences for a company's productivity and competitiveness. As a result, enormous annual resources are devoted to installing and enhancing cyber security systems.

Cybercrime is of particular concern for companies holding valuable and confidential intellectual property. Such value tempts industrial espionage, which may result in the stealing and dissemination of a company's intellectual property.

There are two traditional options to combat cybercrime: firewalls and intrusion detection systems. A firewall is essentially a gatekeeper at a network's communication access point. Designed to prevent intrusions, a firewall sits on a network's connection perimeter and evaluates incoming traffic for evidence of an intrusion. Firewalls are only partially effective and can cause significant delays in communication speed. Firewalls' effectiveness hinges on recognizing the signature(s) of an intrusion. If an intrusion is not known to the firewall, the intrusion may pass through undetected. Once inside the network, some intrusions can simulate the activity of inter-nodal communication, concealing their presence and activities. Firewalls are also a drain on system resources—screening every in-bound communication uses a substantial amount of processing resources.

Intrusion detection systems are designed to look deeply into network packets to identify behavioral signatures of previously identified breaches. This also includes processing a large volume of data, which takes significant time. Also, intrusion detection systems require knowledge of the signature of a particular intrusion, and overzealous systems typically produce a large number of false positives.

SUMMARY OF THE INVENTION

The presently disclosed embodiments are directed to solving one or more of the problems presented in the prior art, as well as providing additional features that will become readily apparent by reference to the following detailed description when taken in conjunction with the accompanying drawings. In some embodiments, a system for identifying a network intrusion comprises four modules. The first module monitors network transmissions and creates a model of regular network activity. The second module receives the model of regular network activity and sets a threshold for irregular usage based on the model. The third module receives the threshold, compares a value of a candidate inter-nodal transmission of the network to the threshold, and identifies a potential intrusion when the value exceeds the threshold. The fourth module analyzes a transmission behavior of one or more nodes of the candidate inter-nodal transmission and identifies the network intrusion.

In some embodiments, the first module monitors internet protocol ("IP") headers of network transmissions. In some further embodiments, the first module monitors one or more of the following fields only: a source IP address, a destination IP address, a source port, a destination port, a date of transmission, a time of transmission, and a transmission packet size.

In some embodiments, the first module monitors IP headers of representative nodes of the network for a predetermined period and creates a statistical baseline of network transmissions.

In some embodiments, the first module creates a model of regular network activity by revising a pre-existing model of regular network activity.

In some embodiments, the second module sets one or more thresholds by time of day, day or week, or day of month.

In some embodiments, the third module determines a likelihood that the candidate inter-nodal communication is an actual intrusion. In some further embodiments, the third module monitors the one or more nodes when the likelihood exceeds a first predetermined likelihood. In some further embodiments, the third module gathers full packet information of the one or more nodes when the likelihood exceeds a second predetermined likelihood. In some embodiments, the third module places the one or more nodes on a watch list when the likelihood exceeds a third predetermined likelihood.

In some embodiments, the fourth module analyzes transmissions between the one or more nodes and another node of the network. In some further embodiments, the analyzed transmission is direct or indirect. In some further embodiments, the another node is one or more of a node on a watch list, a black list, a security-sensitive node, and a node from another potential intrusion in the network.

In some embodiments, the fourth module compares the transmission behavior to a transmission signature of a known intrusion.

In some embodiments, the functions of two or more of the first, second, third, and fourth modules may be combined into a single module. In some embodiments, the functions of one of the first, second, third, and fourth modules may be divided between multiple modules.

In some embodiments, a method for identifying a network intrusion comprises creating a model of regular network activity by monitoring IP headers of network transmissions, setting a threshold for irregular usage based on the model, comparing a value of a candidate inter-nodal transmission of the network to the threshold, identifying a potential intrusion when the value exceeds the threshold, and identifying the network intrusion by analyzing a transmission behavior of one or more nodes of the candidate inter-nodal transmission.

In some embodiments, a non-transitory computer-readable recording medium is encoded with a control program for identifying a network intrusion and the control program causes a computer to execute creating a model of regular network activity by monitoring internet protocol headers of network transmissions, setting a threshold for irregular usage based on the model, comparing a value of a candidate inter-nodal transmission of the network to the threshold, identifying a potential intrusion when the value exceeds the threshold, and identifying the network intrusion by analyzing a transmission behavior of one or more nodes of the candidate inter-nodal transmission.

In some embodiments, creating a model of regular network activity comprises monitoring IP headers of representative nodes of the network for a predetermined period and creating a statistical baseline of network transmissions.

In some embodiments, creating a model of regular network activity comprises revising a pre-existing model of regular network activity.

In some embodiments, monitoring IP headers consists of monitoring one or more of the following fields of the IP headers: a source IP address, a destination IP address, a source port, a destination port, a date of transmission, a time of transmission, and a transmission packet size.

In some embodiments, setting the threshold for irregular usage comprises setting one or more thresholds by time of day, day or week, or day of month.

In some embodiments, identifying the potential intrusion further comprises determining a likelihood that the candidate inter-nodal communication is an actual intrusion. In some further embodiments, the method comprises heightened monitoring of the one or more nodes when the likelihood exceeds a first predetermined likelihood. In some further embodiments, the method comprises gathering full packet information of the one or more nodes when the likelihood exceeds a second predetermined likelihood. In some further embodiments, the method comprises placing the one or more nodes on a watch list when the likelihood exceeds a third predetermined likelihood.

In some embodiments, analyzing the transmission behavior of the one or more nodes comprises analyzing transmissions between the one or more nodes and another node of the network. In some further embodiments, the analyzed transmission is direct or indirect. In some further embodiments, the another node is one or more of a node on a watch list, a black list, a security-sensitive node, and a node from another potential intrusion in the network.

In some embodiments, analyzing the transmission behavior of the one or more nodes comprises comparing the transmission behavior to a transmission signature of a known intrusion.

DETAILED DESCRIPTION

Disclosed herein are devices, systems, methods, and computer-readable mediums for enhancing identification of cyber intrusions in a network and reducing the resources required to identify such intrusions. In some embodiments, a model of regular network activity is created. Using the model, thresholds for irregular usage are set and aspects of candidate transmissions within the network are compared to the thresholds. If a transmission exceeds a threshold in one or more aspects, an alarm is raised and deeper investigation is undertaken. The deeper investigation may closely monitor certain aspects of the network and the network's communication profile in order to identify an actual intrusion.

By creating a model of the network's regular usage, the present disclosure may beneficially reduce the resources required to police activity in the network. The expenditure of resources may, in some embodiments, be further reduced by monitoring only IP headers of transmissions.

Further, by separating the identification of a potential intrusion and investigation of an identified potential intrusion, resources can be saved for those network activities which represent a greater likelihood of posing a threat. When no potential intrusions are identified (thus representing a low likelihood of an intrusion in the network), less resources can be devoted to cyber security.

Figure 1:
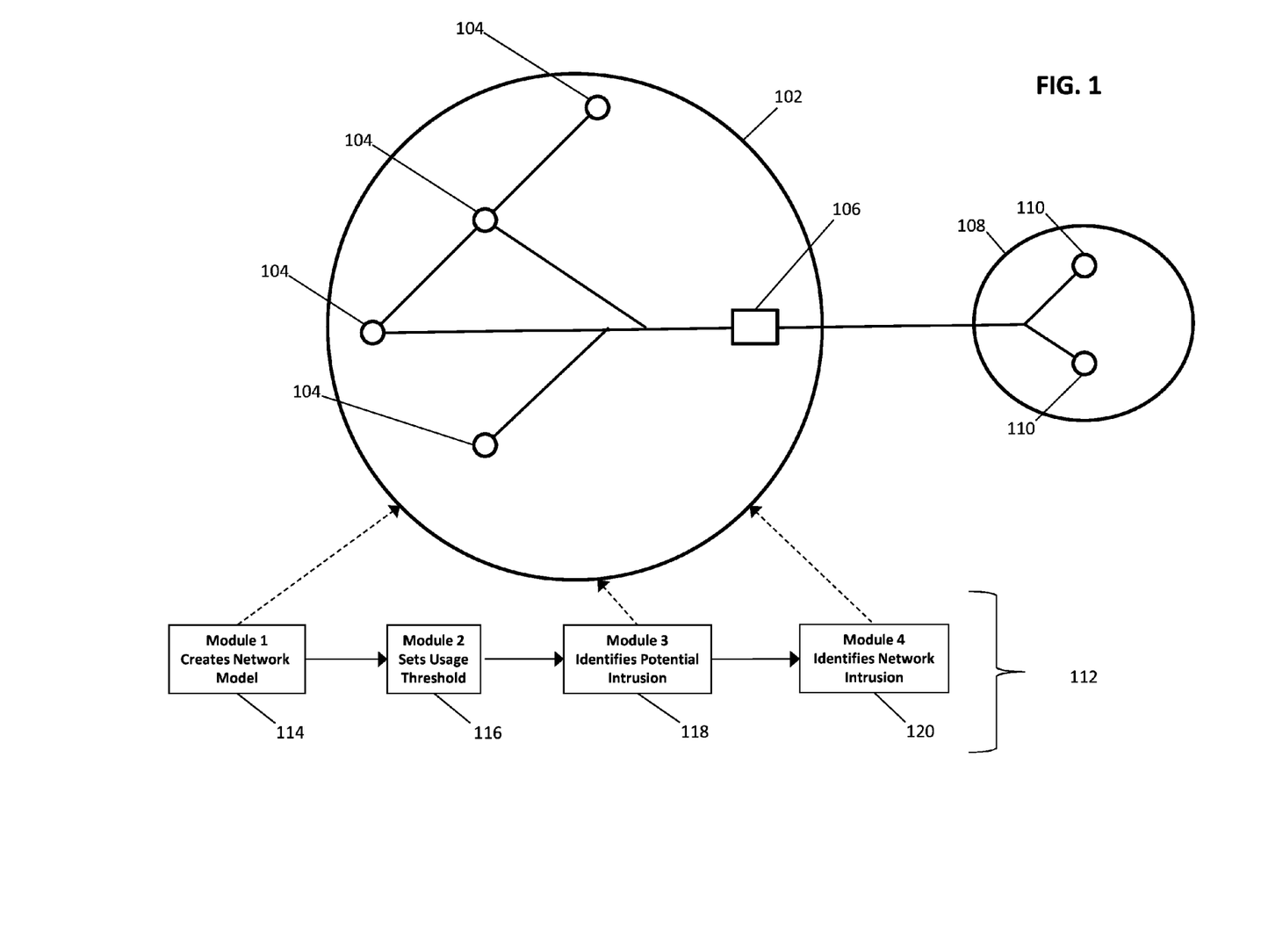
FIG. 1 depicts a system of identifying intrusions in a network in accordance with some embodiments.

FIG. 1 depicts a system 112 of identifying intrusions in a network 102 of multiple nodes 104 in accordance with some embodiments. System 112 monitors the communications of the nodes 104 using four modules 114, 116, 118, and 120.

The first module 114 monitors and tracks network transmissions to create a model of regular network activity. As noted above, this model of network usage may be leveraged to reduce the system resources required for ongoing intrusion-identification.

In some embodiments, the first module 114 monitors only the IP headers of network transmissions. Beneficially, this may further reduce the expenditure of resources. In some further embodiments, the monitored fields of the IP headers include one or more of a source IP address, a destination IP address, a source port, a destination port, a date of transmission, a time of transmission, a transmission packet size, a transmission direction, and a transmission location (internal or external to the network).

In some embodiments, the first module 114 tracks inter-nodal communication over a period of time. For example, the first module 114 may track communications over a ten-minute period. In some further embodiments, the communications over the ten-minute period may be averaged or summarized. In some embodiments, the tracking is repeated continuously, with an average or summary recorded for a period and then a different recording starting immediately. In other embodiments, tracking is discontinuous, with periods of time between recordings. The inter-nodal communication may be for each node pair associated with the network, or may be for a select or exemplary set of node pairs. In some embodiments, the communication is port specific; that is, for a node with multiple ports, the system may track communication specific to each port.

In some embodiments, the first module 114 creates a model of regular network activity by revising a pre-existing model of regular network activity. This may beneficially account for changes in a company's workforce or workflow, which may consequently change regular network activity. In some embodiments, the model may be revised based upon intrusions identified in the subject network or in other networks. In some embodiments, the model of regular network activity may be rebuilt from the beginning, rather than attempting to revise a potentially stale model.

The second module 116 receives the model of regular network activity from first module 114, and sets a threshold of irregular usage based upon the model. The threshold of irregular usages provides a yardstick by which to identify potential intrusions. The third module 118 identifies a potential intrusion by receiving the threshold from the second module and comparing that threshold to a value associated with a candidate inter-nodal transmission of the network.

In some embodiments, thresholds are functions of a variety of transmission parameters, including one or more of frequency of transmissions, size of transmissions, time of transmission, etc. Thresholds may be specific to a time of day, day or week, day of month, etc. Thresholds may be specific to a particular node or group of nodes. For example, anomalous activity of one group of nodes (for example, terminals in one time zone) at one time may be regular for another group of nodes at the same moment (for example, terminals in a different time zone).

In some embodiments, thresholds are set using anomalytics models operating on the model of regular network activity. Each one of the anomalytics models may quantify different aspects of the inter-nodal communications. Such aspects may include number of packets, device payload size, whether a session is in progress (TCP network level, establish), IP X IP Pairs (two IPS are speaking), the quantity and type of servers accessed by a node, server by port (which orts does it normally serve), the quantity of activity at a node, IP X port (server by client), IP X IP X port (two nodes, if the node is a client node or an external node, server IP X port, asn activity, server X asn. Other aspects considered in the models may include a quantity of login failures at a node and nodes where login-access is sought. Each of the models provides information on regular usage that is utilized to set thresholds. In some embodiments, the thresholds may be varied to reflect a given network's specific goals. For example, a large number of false positives may be unacceptable to a high-volume, high profit margin, or high return on investment, retail business because of the consequent disruption to profitable or valuable sales. On the other hand, a system with highly-classified information, or other situation where the cost of a failed detection is high, may find false negatives or detection failures unacceptable because of the inability to secure or recover lost information.

In some embodiments where the first module 114 aggregates or summarizes communication over a period of time, the second module 116 may utilize that summary or aggregate for threshold setting. For example, the anomalytics models may operate on the aggregate or summary of each time period, rather than actual inter-nodal communications. This may serve to further reduce the resources that are necessary to police the network and identify intrusions. As used herein, an anomalytics model can be understood to include analytical algorithms for detecting behavioral anomalies in network transmissions.

In some embodiments, system 112 includes one or more predetermined likelihoods, each resulting in additional measures taken by the system. The third module 118 may determine a likelihood that a candidate inter-nodal communication is an actual intrusion, and compare that likelihood to the predetermined likelihoods. In some embodiments, exceeding a first predetermined likelihood causes the system to enhance monitoring of the one or more nodes of the candidate inter-nodal communication. In some embodiments, exceeding a second predetermined likelihood causes the system to gather full packet information of the one or more nodes. Full packet information may be gathered by the first module, or another module could be utilized for this function. In some embodiments, exceeding a third predetermined likelihood causes the system to place the one or more nodes on a watch list, discussed in more detail below with respect to the fourth module 120. In some embodiments, exceeding a fourth predetermined threshold causes the system to place the one or more nodes on a black list, discussed in more detail below with respect to the fourth module 120.

In some embodiments, the third module 118 may utilize the same anomalytic models used by the second module to establish the thresholds. For example, if a threshold is set as a function of payload size and packet type, the third module may analyze the candidate inter-nodal transmission's payload size and packet type to determine whether the candidate transmission is a potential intrusion. In some embodiments, the threshold may have been quantified so that a threshold is exceeded whenever any combination of anomalous models reaches a value associated with that threshold.

Once the third module 118 has identified a potential intrusion, the information regarding the potential intrusion is sent to the fourth module 120 for deeper investigation. Fourth module 120 investigates the network intrusion by analyzing a transmission behavior of one or more nodes of the candidate inter-nodal transmission.

In some embodiments, the fourth module 120 analyzes the full packet information gathered as a result of the likelihood exceeding the second threshold discussed above with respect to third module 118. This deep packet investigation may include analyzing the content of the transmission, the message type, message encoding, information in the transmission header, the transmission direction, etc.

In some embodiments, the fourth module compares the transmission behavior to a transmission signature of a known intrusion. In some embodiments, the fourth module references a historical data base of potential intrusions in analyzing the transmission behavior. For example, a prior potential intrusion may include nodes A and B. The currently analyzed transmission behavior may include nodes B and C. Because node B has been involved in two potential intrusions, the likelihood that the inter-nodal transmission indicates an actual intrusion may be adjusted.

In some embodiments, the fourth module analyzes transmissions between the one or more nodes and another node of the network. The transmission may be direct or indirect. As used herein, an "indirect transmission" between first and second nodes can be understood to include an intermediary node, and there communication travels from the first node to the intermediary node and then to the second node. As used herein, a "direct transmission" can be understood to include no intermediary node in a transmission between two nodes.

In some further embodiments, the another node analyzed by the fourth module includes one or more of a node on a watch list, a black list, a security-sensitive node, and a node from another potential intrusion in the network. A watch list may include nodes internal to the system which have raised one or more alarms based on a previous anomalous transmission. A black list may include nodes external to the system which have been determined to pose a severe security risk, such as a node from a particular geographic region or a node associated with cybercriminals. A security-sensitive node may be understood to be any node that is predetermined to have access to information critical to the company's interests.

In some embodiments, a fifth module (not shown) may fuse and cross-reference the information gathered and analyzed by each of the modules. For example, a fifth module may direct the first module to reconfigure the model of regular network usage following detection of a potential intrusion or an actual intrusion. In one example, the fifth module is notified of an actual intrusion by the fourth module and directs the first module to remove any signature associated with the actual intrusion from the model of regular network usage. The system may then re-train the model using machine learning. This may include rebuilding the model of regular network activity by sanitizing the data, removing the communications associated with the actual intrusion or by removing the transmission of another intrusion that was made evident by identifying the actual intrusion, and then retraining the regular activity model based on the sanitized data. As used herein, to fuse gathered information can be understood to mathematically combine the risk estimates of the other modules, producing a single coherent risk estimate, recommendations for action, etc.

As used herein, nodes could be understood to be any address in a system. These addresses may include a computer terminal, a server, a database, a mobile device, etc.

In some variations, devices may be identified by profiles which can correlate multiple transmissions of the device even when that device accesses a network through different addresses. By associating an inter-nodal transmission with a device profile, a later inter-nodal transmission involving the same device, albeit through a different node, may receive heightened scrutiny. For example, a laptop may be connected to the network at distinct nodes during different transmissions. If both transmissions exhibit anomalous behavior, the system can take specific action on the device, such as increasing the likelihood that an inter-nodal transmission of the device is an actual intrusion, placing the device on a watch list, restricting access of the device to sensitive nodes, etc.

FIG. 1 also includes an external network 108, which could include the internet or other external network. External network 108 includes nodes 110. The externality of nodes 110 may be considered by the modules when creating the model of regular network activity, setting thresholds, or analyzing inter-nodal transmissions.

FIG. 1 also illustrates a gate-module 106 inside the network that serves as the first point of communication between an external network and the network 102. Such a gate-module could be software or hardware, such as firewall, a router, or a modem, for example. Some networks may not include such a gate-module.

As used herein, the term module should be construed broadly to refer to software, hardware, or any suitable device, means, or mechanism to carry out the associated function. Although FIG. 1 illustrates the first, second, third, and fourth modules separately, the functions of one or more modules may be combined into a single module. Such single modules may include a multi-core processor, for example. Similarly, the functions of one of the modules may be divided into multiple processors or multiple cores of a multi-core processor. In some embodiments, a module may be a software engine. In some embodiments, a module may be either or both of a software or a hardware component. For example, a software engine may be executed by a processor to create a model of regular network activity—either or both of the software engine or the processor can be considered to be the first module described above in this instance.

FIG. 1 illustrates the first, second, third, and fourth modules located outside of the company's network. However, the modules may be positioned inside or outside the network. For example, in some embodiments the modules are located outside the network, such as in the cloud, for example. In other embodiments, the processors are located inside the network.

In some embodiments, an intrusion can be understood to be a disturbance in regular network activity. For example, an anomalous transmission may be detected as a variance from expected network transmissions. These anomalies may be identified at the network or applications levels.

In some embodiments, inter-network sharing may enhance the intrusion identification systems described herein. For example, a first network that identifies an actual intrusion in its network may relay the behavior and signature patterns of that intrusion to other networks, for use in the other network's identification procedures.

In some embodiments, network 102 may be an enterprise network. Such networks may include a computer network built by a business to interconnect its various company sites (such as production sites, offices, and retail outlets) in order to share computer resources and company data.

Figure 2:
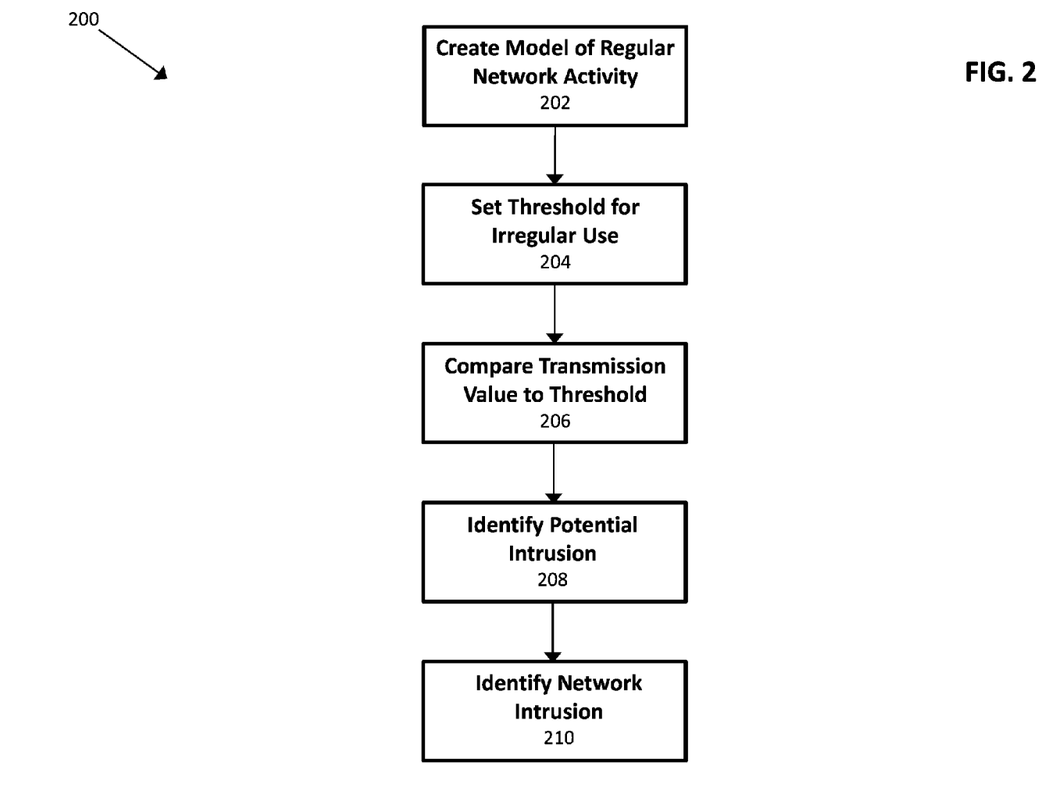
FIG. 2 depicts a method of identifying intrusions in a network in accordance with some embodiments.

FIG. 2 depicts a method 200 of identifying intrusions in a network in accordance with some embodiments. Method 200 may be implemented by system 112 described above.

Method 200 includes creating 202 a model of regular network activity by monitoring IP headers of network transmissions, setting 204 a threshold for irregular usage based on the model, comparing 206 a value of a candidate inter-nodal transmission of the network to the threshold, identifying 208 a potential intrusion when the value exceeds the threshold, and identifying 210 the network intrusion by analyzing a transmission behavior of one or more nodes of the candidate inter-nodal transmission.

The above description was offered primarily with regards to the IP layer of the "internet protocol suite" networking model. However, it should be understood that other networking models could be used, including IBM Systems Network Architecture, Open Systems Interconnection, NetBIOS, and Xerox Network Systems, for example. Further, although the above description was offered primarily with regards to the IP layer of the internet protocol suite networking model, other layers from that model (or any other model) could be used without deviating from the scope of the disclosure, including the transport channel protocol ("TCP"), for example. In addition, multiple layers within a networking model could be utilized simultaneously by the present disclosure. For example, an IP layer may be used to create a model of regular network usage, but the TCP layer may be used to facilitate a deep packet investigation. In some embodiments, multiple layers are utilized to achieve one function, such as using an IP layer and a TCP layer to create the model of regular network usage or using an IP layer and a TCP layer for deep packet investigation. For example, the ports discussed above with respect to deep packet investigation may be the ports of the TCP layer.

The embodiments described above may operate on one or more server computers, including non-transitory computer readable recording media on a server computer. This readable media contains the program instructions for accomplishing various steps described above. In the context of this document, a computer-readable recording medium can be any medium that can contain or store programming for use by or in connection with an instruction execution system, apparatus, or device. Such computer readable media may be stored on a memory, where a memory is any device capable of storing a computer readable medium and capable of being accessed by a computer. A memory may include additional features. A computer may include a processor. A processor can be any device suitable to access a memory and execute a program stored thereon.

The software program can be executed by a CPU on a server. This server may be the same or different from servers operated by the monitored network. In some embodiments, the software program resides in a server that remotely monitors the monitored network. In these embodiments, a company may pay for services that provide intrusion identification and protection. In some embodiments, the system may be connected to a plurality of service providers.

The communications may be transmitted between nodes over a communications network, such as the Internet. Other communications technology may include, but is not limited to, any combination of wired or wireless digital or analog communications channels, such as instant messaging (IM), short message service (SMS), multimedia messaging service (MMS) or a phone system (e.g., cellular, landline, or IP-based). These communications technologies can include Wi-Fi, BLUETOOTH and other wireless radio technologies.

The disclosure may be implemented in any suitable form, including hardware, software, firmware, or any combination of these. The disclosure may optionally be implemented partly as computer software running on one or more data processors and/or digital signal processors. The elements and components of an embodiment of the disclosure may be physically, functionally, and logically implemented in any suitable way. Indeed, the functionality may be implemented in a single unit, in multiple units, or as part of other functional units. As such, the disclosure may be implemented in a single unit or may be physically and functionally distributed between different units and processors.

Figure 3:
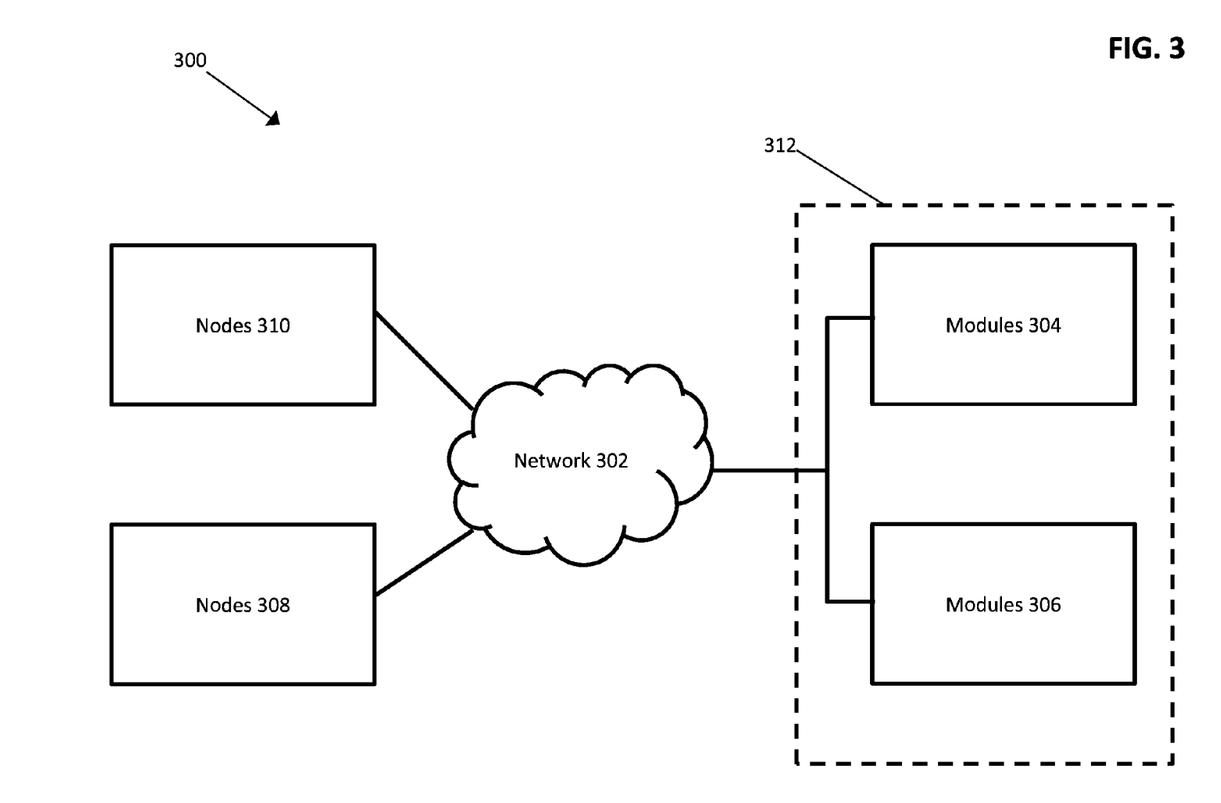
FIG. 3 depicts a system 300 for monitoring network intrusions in accordance with one embodiment.

FIG. 3 depicts a system 300 for monitoring network intrusions in accordance with one embodiment. The system includes external nodes 308 that communicate with network 302. System 300 includes modules 304 and 306 that are configured to monitor communications within the network 302 or between the network and the external nodes 308 or 310, or any combination thereof. Modules 304 and 306 may reside on a common server 312 or different servers. Network 302, modules 304 and 306, and nodes 308 and 310 can be or can include computers running MICROSOFT WINDOWS, MAC OS, UNIX, LINUX or another operating system (OS) or platform.

External nodes 308 and 310 can be any communications device for sending and receiving communications, for example, a desktop or laptop computer, a smartphone, a wired or wireless machine, device, or combinations thereof. Nodes 308 and 310 can be any portable media device such as a digital camera, media player, or another portable media device. These devices may be configured to send and receive messages through a web browser, dedicated application, or other portal.

As shown in FIG. 3, system 300 may comprise a server 312 operated to analyze communications associated with network 302. In some embodiments, modules 304 and 306 reside on different servers. Embodiments of the described systems and methods may monitor numerous distributed servers and nodes. FIG. 3 shows only two nodes, one network, and two modules for the sake of simplicity.

Figure 4:
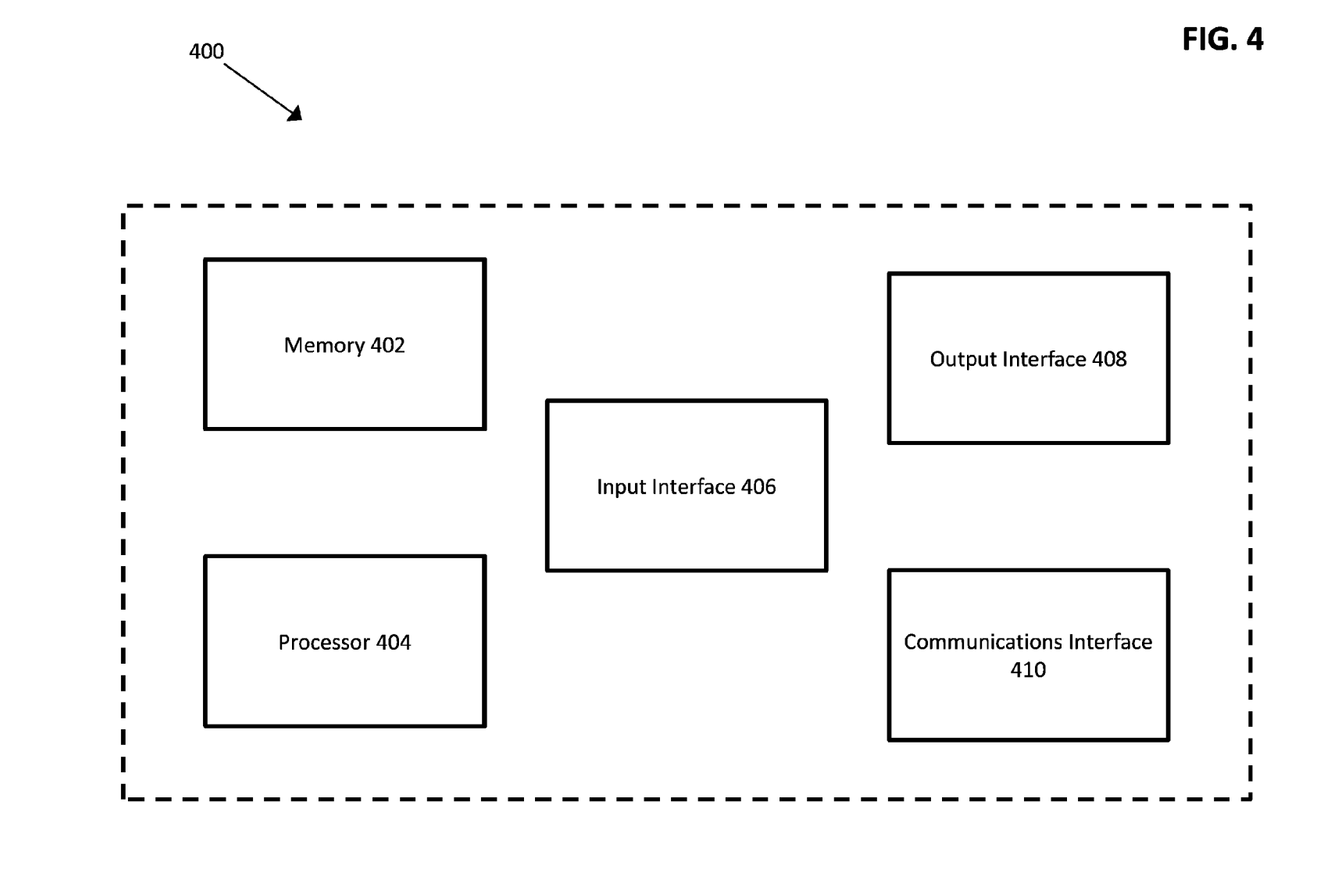
FIG. 4 depicts a computer 400 for implementing the disclosure in accordance with one embodiment.

Specific hardware aspects of system 300, as well as aspects of software stored within its memory, apart from specific modules that implement the disclosed embodiments, are conventional and known. For reference, a computer 400 capable of implementing the disclosed embodiments is illustrated in FIG. 4. Computer 400 includes a memory 402, a processor 404, an input interface 406, an output interface 408, and a communications interface 410.

Memory 402 may include volatile and non-volatile storage. For example, memory storage may include read only memory (ROM) in a hard disk device (HDD), random access memory (RAM), flash memory, and the like. The OS and application programs may be stored in ROM.

Specific software modules that implement embodiments of the described systems and methods may be incorporated in application programs on a server. The software may execute under control of an OS, as detailed above. When stored on a server, embodiments of the described systems and methods can function and be maintained in a manner that is substantially, or totally, transparent to users of the network and external nodes.

Processor 404 may include any device suitable to access a memory and execute a program stored thereon.

Input interface 406 may include a keyboard or mouse, for example. Output interface 408 may include a conventional color monitor and printer, such as a conventional laser printer. Output interface 408 may provide requisite circuitry to electrically connect and interface the display and printer to the computer system.

Communications interface 410 may allow the network and nodes to connect directly, or over another network, to other nodes or networks. The network can include, for example, a local area network (LAN), a wide area network (WAN), or the Internet. In some embodiments, the network, modules, and nodes can be connected to another client, server, or device via a wireless interface.

In some embodiments the input interface, processor, memory, communications interface, output interface, or combinations thereof, are interconnected by a bus.

The disclosed embodiments could be embodied as a JAVA tool, which means it can run on any platform that is JAVA enabled. Embodiments can run on a web server that provides a website for administrators to monitor the system results remotely. Anyone with administrative access to the web server can connect to and use visualization tools to take actions within a visualization. The embodiments can run on any type of server, including virtual servers or an actual machine.

The disclosed embodiments may be embodied on a distributed processing system to break processing apart into smaller jobs that can be executed by different processors in parallel. The results of the parallel processing could then be combined once completed.

Although the present invention has been fully described in connection with embodiments thereof with reference to the accompanying drawings, it is to be noted that various changes and modifications will become apparent to those skilled in the art. Such changes and modifications are to be understood as being included within the scope of the claimed subject matter. The various embodiments of the invention should be understood that they have been presented by way of example only, and not by way of limitation. Although the invention is described above in terms of various exemplary embodiments and implementations, it should be understood that the various features and functionality described in one or more of the individual embodiments are not limited in their applicability to the particular embodiment with which they are described. They instead can, be applied, alone or in some combination, to one or more of the other embodiments of the invention, whether or not such embodiments are described, and whether or not such features are presented as being a part of a described embodiment. Thus the breadth and scope of the claimed subject matter should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known," and terms of similar meaning, should not be construed as limiting the item described to a given time period, or to an item available as of a given time. But instead these terms should be read to encompass conventional, traditional, normal, or standard technologies that may be available, known now, or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated. For example, "at least one" may refer to a single or plural and is not limited to either. The presence of broadening words and phrases such as "one or more," "at least," "but not limited to," or other like phrases in some instances shall not be read to mean that the narrower case is intended or required in instances where such broadening phrases may be absent. The word "exemplary" is used herein to mean "serving as an example or illustration." Any aspect or design described herein as "exemplary" is not necessarily to be construed as preferred or advantageous over other aspects or designs.

It will be appreciated that, for clarity purposes, the above description has described embodiments of the invention with reference to different functional units and modules. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only to be seen as references to suitable means for providing the described functionality, rather than indicative of a strict logical or physical structure or organization.

In the foregoing description of exemplary embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the claimed subject matter.

It should be understood that the specific order or hierarchy of steps in the processes disclosed herein is an example of exemplary approaches. Based upon design preferences, it is understood that the specific order or hierarchy of steps in the processes may be rearranged while remaining within the scope of the claimed subject matter.

What is claimed is:

1. A method for identifying a network intrusion comprising:
    creating, using at least one computing device, a model of regular network activity associated with at least two devices on a network by monitoring internet protocol headers of network transmissions, wherein creating the model comprises:
        monitoring internet protocol headers of representative nodes of the network for a predetermined period and based upon the monitoring, performing one of:
            creating a statistical baseline of network transmissions, or
            revising a pre-existing model of regular network activity;
    setting a threshold for irregular usage based on the model;
    comparing a value of a candidate inter-nodal transmission of the network to the threshold;
    identifying a potential intrusion when the value exceeds the threshold, wherein identifying the potential intrusion comprises determining a likelihood that the candidate inter-nodal communication associated with one or more nodes is an actual intrusion;
    based upon the determination of the likelihood, performing one or more operations comprising:
        when the likelihood exceeds a first predetermined likelihood, performing heightened monitoring of the one or more nodes,
        when the likelihood exceeds a second predetermined likelihood, gathering full packet information of the one or more nodes, or
        when the likelihood exceeds a third predetermined likelihood, placing the one or more nodes on a watch list; and
    identifying the network intrusion by analyzing a transmission behavior of one or more nodes of the candidate inter-nodal transmission.

2. The method of claim 1, wherein monitoring internet protocol headers consists of monitoring one or more of the following fields of the internet protocol headers: a source internet protocol address, a destination internet protocol address, a source port, a destination port, a date of transmission, a time of transmission, and a transmission packet size.

3. The method of claim 1, wherein setting the threshold for irregular usage comprises setting one or more thresholds by time of day, day of week, or day of month.

4. The method of claim 1, wherein analyzing the transmission behavior of the one or more nodes comprises analyzing transmissions between the one or more nodes and another node of the network.

5. The method of claim 4, wherein the transmission behavior comprises at least one of a direct transmission or an indirect transmission.

6. The method of claim 4, wherein the another node is one or more of a node on a watch list, a black list, a security-sensitive node, and a node from another potential intrusion in the network.

7. The method of claim 1, wherein analyzing the transmission behavior of the one or more nodes comprises comparing the transmission behavior to a transmission signature of a known intrusion.

8. The method of claim 1, wherein the threshold is a function of transmission parameters comprising one or more of transmission frequency, transmission size, or transmission time.

9. The method of claim 1, wherein the threshold is specific to one or more particular nodes or groups of nodes.

10. A non-transitory computer-readable recording medium encoded with a control program for identifying a network intrusion, the control program causing a computer to execute:
    creating, using at least one computing device, a model of regular network activity associated with at least two devices on a network by monitoring internet protocol headers of network transmissions, wherein creating the model comprises:
        monitoring internet protocol headers of representative nodes of the network for a predetermined period and based upon the monitoring, performing one of:
            creating a statistical baseline of network transmissions, or
            revising a pre-existing model of regular network activity;
    setting a threshold for irregular usage based on the model;

comparing a value of a candidate inter-nodal transmission of the network to the threshold;

identifying a potential intrusion when the value exceeds the threshold, wherein identifying the potential intrusion comprises determining a likelihood that the candidate inter-nodal communication associated with one or more nodes is an actual intrusion;

based upon the determination of the likelihood, performing one or more operations comprising:

when the likelihood exceeds a first predetermined likelihood, performing heightened monitoring of the one or more nodes, when the likelihood exceeds a second predetermined likelihood, gathering full packet information of the one or more nodes, or when the likelihood exceeds a third predetermined likelihood, placing the one or more nodes on a watch list; and identifying the network intrusion by analyzing a transmission behavior of one or more nodes of the candidate inter-nodal transmission.

11. The non-transitory computer-readable recording medium of claim 10, wherein monitoring internet protocol headers consists of monitoring one or more of the following fields of the internet protocol headers: a source internet protocol address, a destination internet protocol address, a source port, a destination port, a date of transmission, a time of transmission, and a transmission packet size.

12. The non-transitory computer-readable recording medium of claim 10, wherein setting the threshold for irregular usage comprises setting one or more thresholds by time of day, day of week, or day of month.

13. The non-transitory computer-readable recording medium of claim 10, wherein analyzing the transmission behavior of the one or more nodes comprises analyzing transmissions between the one or more nodes and another node of the network.

14. The non-transitory computer-readable recording medium of claim 13, wherein the transmission behavior comprises at least one of a direct transmission or an indirect transmission.

15. The non-transitory computer-readable recording medium of claim 13, wherein the another node is one or more of a node on a watch list, a black list, a security-sensitive node, and a node from another potential intrusion in the network.

16. The non-transitory computer-readable recording medium of claim 10, wherein analyzing the transmission behavior of the one or more nodes comprises comparing the transmission behavior to a transmission signature of a known intrusion.

17. The non-transitory computer-readable recording medium of claim 10, wherein the threshold is a function of transmission parameters comprising one or more of transmission frequency, transmission size, of transmission time.

18. A system comprising:
at least one processor; and
memory comprising computer executable instructions that, when executed by the at least one processor, cause the system to:

create, using at least one computing device, a model of regular network activity associated with at least two devices on a network by monitoring internet protocol headers of network transmissions, wherein creating the model comprises:

monitoring internet protocol headers of representative nodes of the network for a predetermined period and based upon the monitoring, performing one of:

creating a statistical baseline of network transmissions, or revising a pre-existing model of regular network activity;

set a threshold for irregular usage based on the model;

compare a value of a candidate inter-nodal transmission of the network to the threshold;

identify a potential intrusion when the value exceeds the threshold, wherein identifying the potential intrusion comprises determining a likelihood that the candidate inter-nodal communication associated with one or more nodes is an actual intrusion;

based upon the determination of the likelihood, perform one or more operations comprising:

when the likelihood exceeds a first predetermined likelihood, perform heightened monitoring of the one or more nodes, when the likelihood exceeds a second predetermined likelihood, gather full packet information of the one or more nodes, or when the likelihood exceeds a third predetermined likelihood, place the one or more nodes on a watch list; and identify the network intrusion by analyzing a transmission behavior of one or more nodes of the candidate inter-nodal transmission.

19. The system of claim 18, wherein monitoring internet protocol headers consists of monitoring one or more of the following fields of the internet protocol headers: a source internet protocol address, a destination internet protocol address, a source port, a destination port, a date of transmission, a time of transmission, and a transmission packet size.

20. The system of claim 18, wherein setting the threshold for irregular usage comprises setting one or more thresholds by time of day, day of week, or day of month.

21. The system of claim 18, wherein analyzing the transmission behavior of the one or more nodes comprises analyzing transmissions between the one or more nodes and another node of the network.

22. The system of claim 18, wherein the transmission behavior comprises at least one of a direct transmission or an indirect transmission.

23. The system of claim 18, wherein the another node is one or more of a node on a watch list, a black list, a security-sensitive node, and a node from another potential intrusion in the network.

24. The system of claim 18, wherein analyzing the transmission behavior of the one or more nodes comprises comparing the transmission behavior to a transmission signature of a known intrusion.

25. The system of claim 18, wherein the threshold is a function of transmission parameters comprising one or more of transmission frequency, transmission size, or transmission time.

26. The system of claim 18, wherein the threshold is specific to one or more particular nodes or groups of nodes.

* * * * *